US009367301B1

(12) United States Patent
Serrano et al.

(10) Patent No.: US 9,367,301 B1
(45) Date of Patent: Jun. 14, 2016

(54) DYNAMIC UPDATE OF A DISTRIBUTED MESSAGE PROCESSING SYSTEM

(71) Applicant: Attivio, Inc., Newton, MA (US)

(72) Inventors: Martin Anthony Serrano, Andover, MA (US); William K. Johnson, III, Waltham, MA (US)

(73) Assignee: Attivio Inc., Newton, MA (US)

( * ) Notice: Subject to any disclaimer, the term of this patent is extended or adjusted under 35 U.S.C. 154(b) by 60 days.

(21) Appl. No.: 13/787,047

(22) Filed: Mar. 6, 2013

(51) Int. Cl.
*G06F 9/445* (2006.01)
*G06F 9/44* (2006.01)

(52) U.S. Cl.
CPC .. *G06F 8/67* (2013.01); *G06F 8/65* (2013.01); *G06F 8/68* (2013.01)

(58) Field of Classification Search
None
See application file for complete search history.

(56) References Cited

U.S. PATENT DOCUMENTS

| | | | |
|---|---|---|---|
| 5,359,730 A | 10/1994 | Marron | |
| 6,748,429 B1 * | 6/2004 | Talluri et al. | 709/221 |
| 6,966,058 B2 * | 11/2005 | Earl | G06F 8/65 709/223 |
| 7,260,818 B1 * | 8/2007 | Iterum | G06F 8/71 717/172 |
| 9,032,053 B2 * | 5/2015 | Kosuru et al. | 709/221 |
| 2005/0267951 A1 * | 12/2005 | Joshi et al. | 709/220 |
| 2006/0174238 A1 * | 8/2006 | Henseler | G06F 8/63 717/168 |
| 2008/0134164 A1 * | 6/2008 | Stich | G06F 8/65 717/172 |
| 2008/0209413 A1 * | 8/2008 | Kakumani et al. | 717/172 |
| 2009/0144720 A1 * | 6/2009 | Roush | G06F 8/65 717/171 |
| 2009/0158268 A1 * | 6/2009 | Pichetti et al. | 717/170 |
| 2010/0070961 A1 * | 3/2010 | Auer | G06F 8/65 717/168 |
| 2010/0162226 A1 * | 6/2010 | Borissov et al. | 717/173 |
| 2010/0293538 A1 * | 11/2010 | Wolf et al. | 717/170 |
| 2011/0138374 A1 * | 6/2011 | Pal | 717/169 |
| 2012/0110150 A1 * | 5/2012 | Kosuru et al. | 709/221 |
| 2014/0075425 A1 * | 3/2014 | Stevenson | G06F 8/67 717/171 |
| 2014/0123123 A1 * | 5/2014 | Bahls | G06F 8/71 717/170 |

OTHER PUBLICATIONS

Ajmani et al. "Modular software upgrades for distributed systems." ECOOP 2006-Object-Oriented Programming. Springer Berlin Heidelberg, 2006. 452-476. Retrieved on [Jan. 22, 2016] Retrieved from the Internet: URL<http://link.springer.com/chapter/10.1007/11785477_26#page-1>.*

Shvachko et al. "The hadoop distributed file system." Mass Storage Systems and Technologies (MSST), 2010 IEEE 26th Symposium on. IEEE, 2010. Retrieved on [Jan. 22, 2016] Retrieved from the Internet: URL<http://ieeexplore.ieee.org/stamp/stamp.jsp?tp=&arnumber=5496972>.*

Kramer, Jeff and Jeff Magee. "Dynamic Configuration for Dynamic Systems." IEEE Transactions on Software Engineering. vol. SE-11, No. 4, Apr. 1985, pp. 424-436.

(Continued)

*Primary Examiner* — Thuy Dao
*Assistant Examiner* — Cheneca Smith
(74) *Attorney, Agent, or Firm* — Patent GC LLC

(57) ABSTRACT

A distributed system with multiple nodes, each of which processes input data streams according to a set of independent, asynchronous processing components connected in a manner represented by a directed graph, is dynamically updated. Such a dynamic update occurs while the system is processing input data by pausing the input data stream, making changes to the system configuration, and then restarting the input data stream. If the update fails for any reason, the system configuration is rolled back to its prior state.

20 Claims, 5 Drawing Sheets

(56) References Cited

OTHER PUBLICATIONS

Miedes, Emili and Francesc D. Munoz-Escoi. "Dynamic Software Update". Instituto Universitario Mixto Tecnológico de Informática, Universitat Politècnica de València, Technical Report ITI-SIDI-2012/004, 2012.

Miedes, Emili, Josep M. Bernabeu-Auban, and Francesc D. Munoz-Escoi. "Software Adaptation through Dynamic Updating". Instituto Universitario Mixto Tecnológico de Informática, Universitat Politècnica de València, Technical Report ITI-SIDI-2012/010, 2012.

Hicks, Michael. "Dynamic Software Updating". PhD. Dissertation, University of Pennsylvania. 2001.

Goudarzi, Kaveh Moazami and Jeff Kramer. "Maintaining Node Consistency in the Face of Dynamic Change." in Proceedings of the International Conference on Configurable Distributed Systems (CDS) 1996, pp. 62.

Evans, Huw and Peter Dickman. "DRASTIC: A Run-Time Architecture for Evolving, Distributed, Persistent Systems." Lecture Notes in Computer Science, Springer 1997, pp. 243-275.

Chen, Haibo, Jie Yu, Rong Chen, Binyu Zang and Pen-Chung Yew. "POLUS: A POwerful Live Updating System." In 29th international conference on Software Engineering, ICSE '07, pp. 271-281. IEEE Computer Society, May 2007.

Chen, Xuejun. "Dynamic Reconfiguration of a Component Based Software System for Vehicles." Proceedings of the 15th Triennial World Congress of the International Federation of Automatic Control (IFAC), 2002.

Brown, Aaron and David A. Patterson. "Rewind, Repair, Replay: Three R's to Dependability." In 10th workshop on ACM SIGOPS European workshop, EW 10, pp. 70-77, Saint-Emilion, France, 2002.

Amjani, Sameer. "Automatic Software Upgrades for Distributed Systems". PhD. Thesis. Department of Electrical Engineering and Computer Science. Massachusetts Institute of Technology. 2004.

Kon, Fabio, Tomonori Yamane, Christopher K. Hess, Roy H. Campbell and M. Dennis Mickunas, "Dynamic Resource Management and Automatic Configuration of Distributed Component Systems", Proceedings of the 6th USENIX Conference on Object-Oriented Technologies and Systems (COOTS '01), 2001.

Kon, Fabio and Roy H. Campbell. "Supporting Automatic Configuration of Component-Based Distributed Systems". 5th USENIX Conference on Object-Oriented Technologies and Systems (COOTS '99), 1999.

Hofmeister, Christine. "Dynamic Reconfiguration of Distributed Applications". PhD Dissertation. Department of Computer Science. University of Maryland. 1993.

\* cited by examiner

DYNAMIC UPDATE OF A DISTRIBUTED MESSAGE PROCESSING SYSTEM

BACKGROUND

Development of distributed information processing systems involves several challenges. A developer is concerned not only with the data processing logic involved in processing data to achieve desired results, but also with the coordination of the distributed components within the system. An example of a coordination problem is the synchronization of components that are executing in parallel.

An example of such a distributed system is a processing system comprised of multiple nodes, in which each node receives, indexes and stores data about ongoing streams of documents, such as within an enterprise. Each node in the system processes input data streams according to a set of independent, asynchronous processing components connected in a manner represented by a directed graph. The set of processing components defines the processing to be performed on the input streams and provides output data, such as indexing information, for storage along with the input data. Such a system is described, for example, in U.S. Patent Publications 2010/0005147 and 20120096475, hereby incorporated by reference.

Development also involves making frequent changes to a system. In particular, a developer makes changes, runs tests, identifies errors or processing improvements to address, and then makes more changes. In this iterative process, valuable time can be lost if the process of updating the system with the changes takes any substantial amount of time. For example, if a system needs to be shut down, modified then rebooted and restarted with a new configuration, substantial time can be lost and ongoing services, such as servicing queries, can be interrupted. If errors exist in the modifications that prevent a stable configuration from emerging, the system might need to be reset back to its original state prior to any changes being made. It would be desirable instead to be able to update such a system while it is running.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A distributed system with multiple nodes, each of which processes input data streams according to a set of independent, asynchronous processing components connected in a manner represented by a directed graph, is dynamically updated. Such a dynamic update occurs while the system is processing input data by pausing the input data stream, making changes to the system configuration, and then restarting the input data stream. If the update fails for any reason, the system configuration is rolled back to its prior state.

The system configuration can be defined by a tree-based data structure, such as a tree of objects defined in memory. This tree of data structures is the program that implements the set of interconnected processing components. Thus, a current configuration and a new configuration can be compared using a tree-based difference algorithm to identify where the new configuration introduces changes to the current configuration. These changes then are used to update the system configuration.

In some cases, an update to a system configuration for one of the nodes in the system results in an error, from which the node can recover. For example, a resource used by the new system configuration could be unavailable. The node can recover from such an error if the resource is made available. After the node recovers from an error during the update, the update process can continue on that node. In some cases, the node can be restarted, and treated as a new node by the update process (in which case the new configuration is installed).

In some cases, the update to the system configuration for one of the nodes results in an error from which the node does not recover. In such a case, the failure of the update at one node causes a rollback process to start, in which case all of the nodes begin to roll back the system configuration to the prior system configuration.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which the such a dynamic update process can be implemented.

Figure 1:
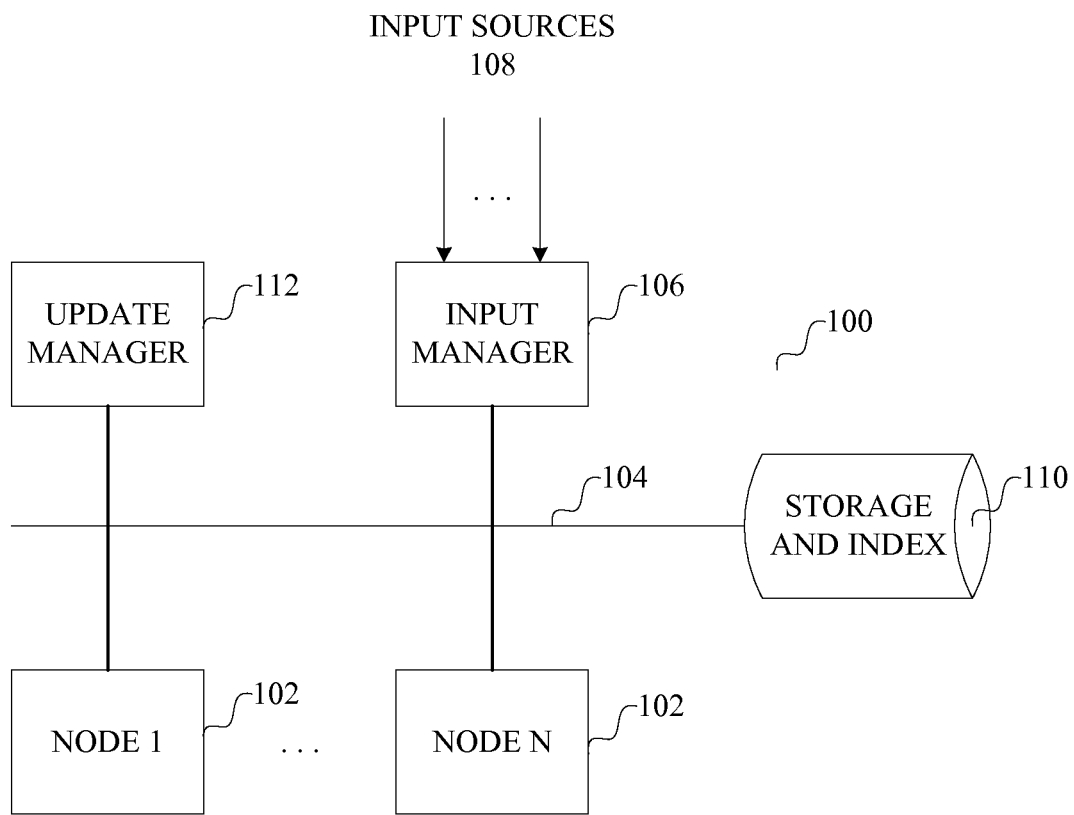
FIG. 1 is a block diagram of a distributed message processing system.

Referring to FIG. 1, a data processing system 100 includes a plurality of nodes 102. Each node is a computer that is programmed to process a stream of input data that is received over a computer network 104. The processing performed by each node can be understood as a process that is defined by set of independent, asynchronous processing components connected in a manner represented by a directed graph. Input data is processed by a node, and the results of such processing are stored in storage 110. Such storage may include storage of the input data, such as a document, and the results of processing that input data, such as an index and other metadata about the document.

With multiple nodes 102, the stream of input data received by each node 102 can be defined through an input manager 106. The input manager is implemented by a computer program on a computer and processes data from a variety of input sources 108 which is provided to the nodes 102 for processing. The data that is received from the variety of input sources can include any combination of structured, semi-structured and unstructured data. Typically, such data includes a variety of documents, files and other data types used within an enterprise.

Each node, within a collection of nodes that are processing data together, can be programmed to performing its processing on its input data streams using a variety of conventional computer programming techniques. Within a collection of nodes, each node is programmed with the same program and the nodes are intended to be in synchronization with each other. There may be different collections of nodes that are programmed differently. In general, the program defines set of independent, asynchronous processing components connected in a manner represented by a directed graph which processes the input data. The program generally has a design version, which is the form in which the developer creates the program, and a runtime version, which is a compiled form of the design version and is deployed to each of the nodes to program the node. The program, in general, is defined by a tree-based data structure, such as a tree of objects defined in memory.

To update the runtime version deployed to the nodes, an update manager 112 manages the update process. First, the differences between any current program and the new program are determined, and these differences are converted into commands that implement the differences, yet are invertible to permit the command to be undone, reversing the change. A dynamic update then occurs while the system is processing input data by pausing the input data stream, making changes to the system configuration by applying commands that implement the determined differences, and then restarting the input data stream after all nodes have successfully completed the update. If the update fails for any reason on one node, the system configuration on all nodes is rolled back to its prior state.

There are a variety of reasons that the update could fail on a node. For example, a node could crash. A resource, such as a file, storage, or the like, specified in the update could be unavailable. File system or similar errors could occur. A node may or may not recover from the error during the update process.

If the node recovers from an error during the update, the update process can continue on that node. In some cases, the node can be restarted, and treated as a new node by the update process (in which case the appropriate configuration is installed to match the other nodes after the update process terminates).

If the node does not recover from the error during the update, the failure of the update at the node causes a rollback process to start, in which case all of the nodes begin to roll back the system configuration to the prior system configuration.

An example of the types of commands to modify the computer program will now be described. In this example, the processing performed by each node is defined as a set of processing components interconnected as a directed graph. Thus, for example, a processing component A may receive input data, process it, and provide an output. The output of processing component A may be connected to the input of processing component B, and so on. Arbitrarily complex types of processing can be defined in this manner. In the following example, the data processing specification provides for a set of workflows, locations for workflows (may be on multiple computers), processing component configurations, connectors (that interconnect processing components), and locations for connectors. A workflow is a set of processing components (which can be references to other workflows, also called subflows).

With such a definition of the program, a simple difference determination between the tree structures defining the program can be used to identify the changes to be made to the runtime version of the program. These differences then can be grouped by the workflow in which they reside. A command for implementing each kind of difference, and its inverse, is then constructed. For example, if a node is added within a workflow, then a command such as "Remove Processing component," with the new code and metadata as parameters, and its inverse "Add Processing component," with the old code and metadata as parameters, can be generated. An example list of typical commands for a tree-based processing specification are provided below in Table I:

Example commands and their inverses: t,?

Additional commands can be provided for pausing a workflow, resuming a workflow and rolling back a workflow (or other component of the computer program), so that several series of commands for different workflows can be provided in a change listing by the update manager.

Given this context, an example implementation of the update manager 112 will be described in more detail in connection with FIGS. 2-4.

Figure 2:
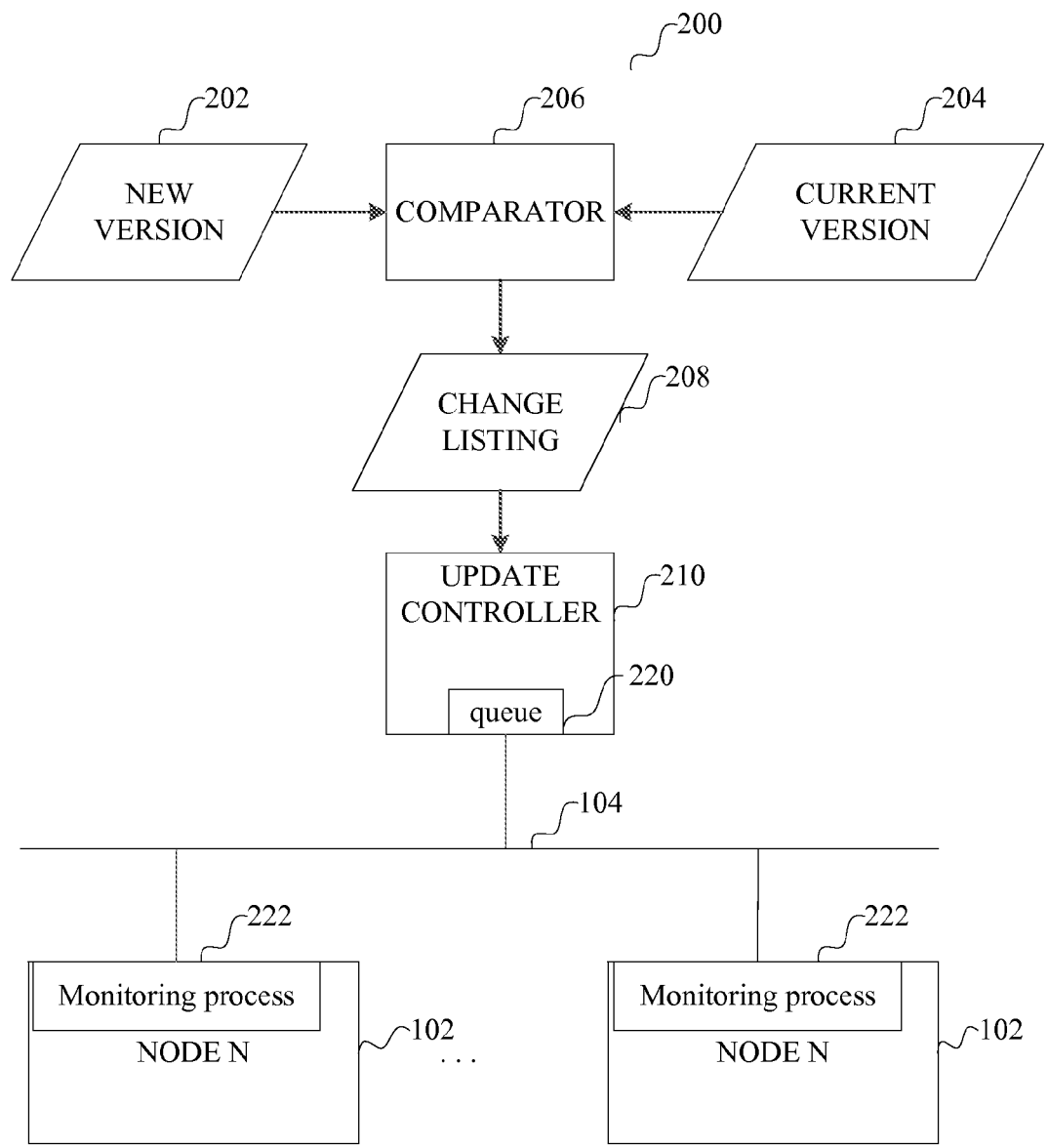
FIG. 2 is a data flow diagram illustrating an example implementation of an update manager for distributed updates of the distribute message processing system.

In FIG. 2, the update manager 200 receives a new runtime version 202 of the program. The prior runtime version 204 of the program is also available, for example, in memory or in a data file. A comparator 206 determines the differences between the new and prior runtime versions of the program, to provide a change listing 208, which is a list of commands to be used by a node to update its program. The change listing 208 is received by an update controller 210, which coordinates the update process with the nodes 102 through communication with the nodes over computer network 104.

There are a variety of processes through which the update process of all of the nodes can be coordinated. By way of example, as shown in FIG. 2, the update controller maintains a queue 220. The queue 220 stores the change listing 208 to be processed by the nodes 102 to update the nodes 220. Each entry in the queue 220 includes a command from the change listing 208 and the status for each node 102 with respect to that change listing, whether pending, completed or failed. Each node 102 has a monitoring process 222 which periodically checks and maintains its status in the queue 220. If the command in the current entry in the queue has not yet been processed by the node, then the node processes the command and then updates the queue. It then waits for the other nodes to complete processing that command before proceeding to the next entry in the queue. When all commands have been processed successfully by all nodes, the update process is complete.

An example framework that can be used to build such an update manager with a coordinated mechanism for ensuring the lock-step updates of nodes is the Zookeeper open-source server, which implements a centralized service for maintaining configuration information and providing distributed synchronization within distributed applications.

Figure 3:
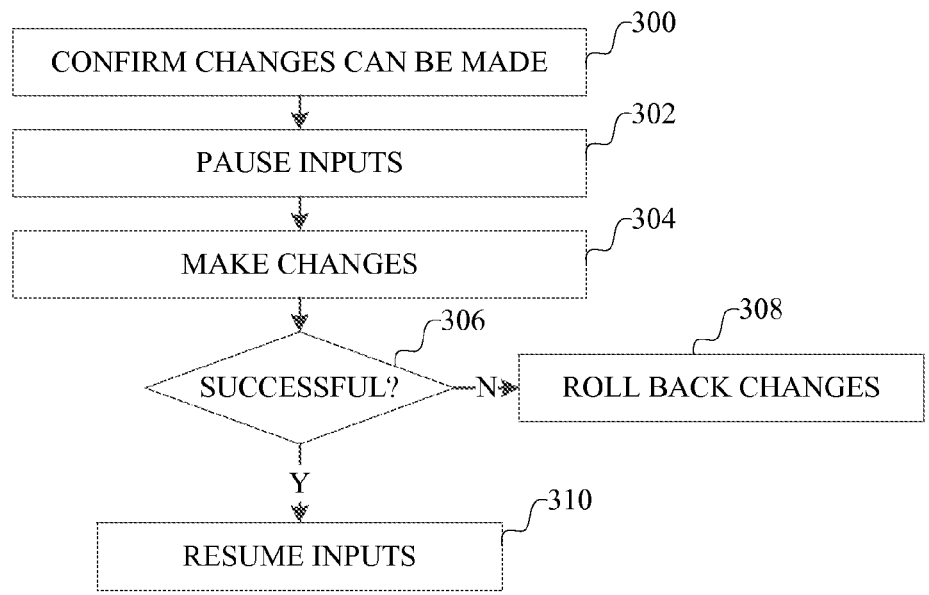
FIG. 3 is a flow chart describing an example operation of an update manager in FIG. 2 for dynamically updating nodes.

Referring now to FIG. 3, a flowchart describing the general overall operation of an example implementation of the update process will now be described. The update process can be performed for an entire computer program, or on a workflow-by-workflow basis within the computer program, or on other subparts of the computer program, depending on how the computer program is specified.

The change listing 208 is processed to confirm 300 whether changes to the system can be made dynamically. For example, if a node 102 is processing data based on some state that is maintained by the node, then such processing could result in errors if changes are made dynamically. As another example, if a node depends on an external service, a dynamic update might result in incorrect processing of communications from that service. If these and similar conditions do not exist, or are otherwise addressed in the update process, then dynamic updating can proceed.

Inputs to the nodes from the input manager are then paused 302. The nodes are then instructed 304 to initiate the updates. If the changes are made successfully, as determined at 306, then the input manager is instructed 308 to resume providing inputs to the nodes. If the changes are not made successfully, then a rollback process is initiated 310.

Figure 4:
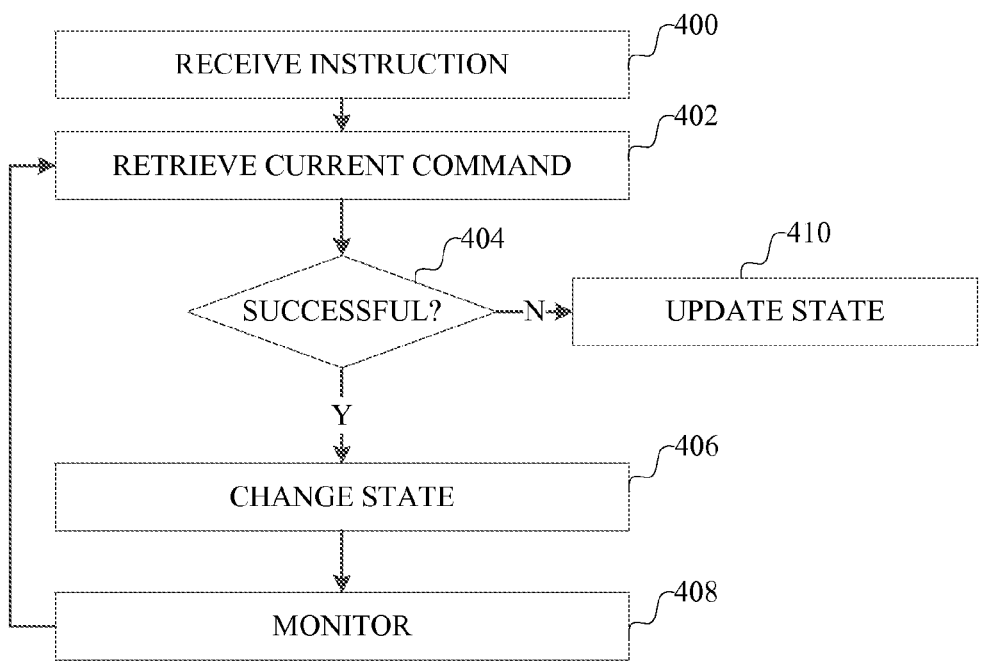
FIG. 4 is a flow chart describing an example operation of a node during a dynamic update.

Using the implementation of the update manager as described in FIG. 2, from the point of view of the node 102, one example implementation of its update process is shown in FIG. 4. The node receives 400 an instruction to begin the update process. The current command is retrieved 402 from the queue of the update manager. Upon successful completion of the update, as determined at 404, the node informs 406 the update manager and the state for that node is updated in the queue. The node monitors 408 the status of the other nodes until all nodes have successfully updated before repeating these steps for the next command in the change list, as indicated at 402. If the node fails in the update, then the node updates 410 its state to indicate a failure condition.

A failure condition is any error from which the node cannot recover. Various errors may occur, from which the node can recover. If the node recovers from the error and completes the update, then the change is successful.

One case of a potential failure is the complete failure of the node, i.e., a crash, in which the node is restarted. In such an instance, the node appears to the update manager to have been removed from the system. Upon restart, the node appears to the update manager as a new node in the system. If a node is removed from the system during the update process, its state is removed from the update queue. Thus, if a node fails and is holding up the update process of other nodes, it can be restarted, permitting the remaining nodes to update. If a node is added to the system during the update process, it waits until the update process has completed for the other nodes, and then is started with the configuration of the nodes (which may be the new configuration or old configuration depending on the success of the update).

Figure 5:
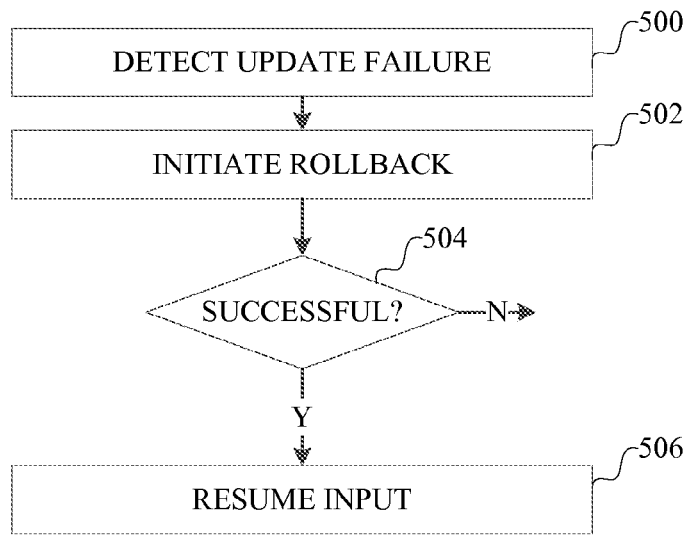
FIG. 5 is a flow chart describing an example operation of an update manager in FIG. 2 for roll back of an update to nodes.
Figure 6:
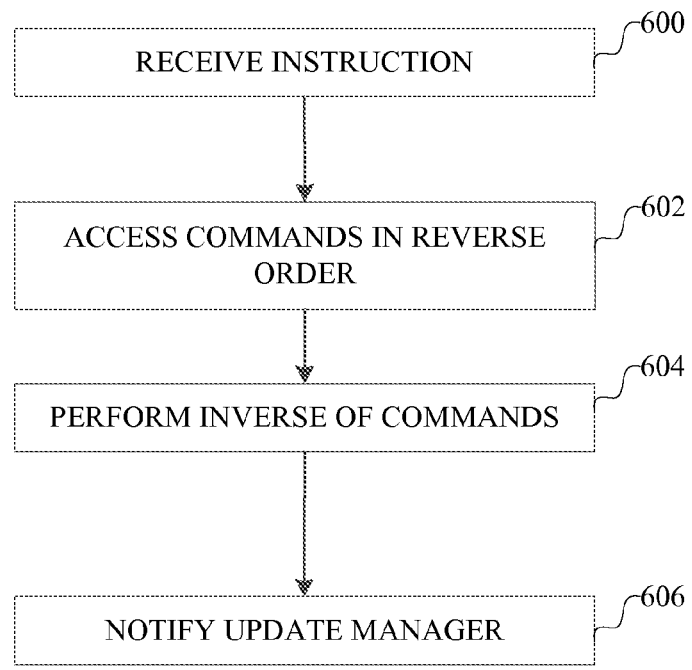
FIG. 6 is a flow chart describing an example operation of a node during roll back of an update.

Referring now to FIGS. 5 and 6, the roll back process will now be described. The rollback process involves having each node perform the inverse of the commands previously performed, in reverse order. As noted above each command in the change listing is defined in a manner such that it is invertible.

The update manager determines 500 that a roll back is to occur. For example, each of the nodes may have failed to successfully execute one of the commands in the change listing. All of the nodes are then instructed 502 to perform the rollback process. If each node indicates to the update manager that it has successfully rolled back the update, so as to be in the last stable configuration prior to the update, as indicated at 504, then the nodes and input manager can be instructed to resume processing, as indicated at 506.

From the perspective of a node, a node receives 600 an instruction to initiate a rollback. Next, the node accesses 602 the commands in the queue from the update manager (or a cache of such commands at the node) in the reverse order in which they were originally performed, and performs 604 the inverse of those operations. Upon completion of the rollback, the node notifies 606 the update manager of success or failure of the rollback.

If at any time during the update or rollback process it becomes apparent that the nodes are out of synchronization or otherwise are not in the same stable configuration, they can all be restarted with the last known good configuration.

Having now described an example implementation, an example computer, in which components, such as an update manager, node, input manager and the like, of such a data processing system with dynamic updating is designed to operate, will now be described. The following description is intended to provide a brief, general description of a suitable computer with which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 7:
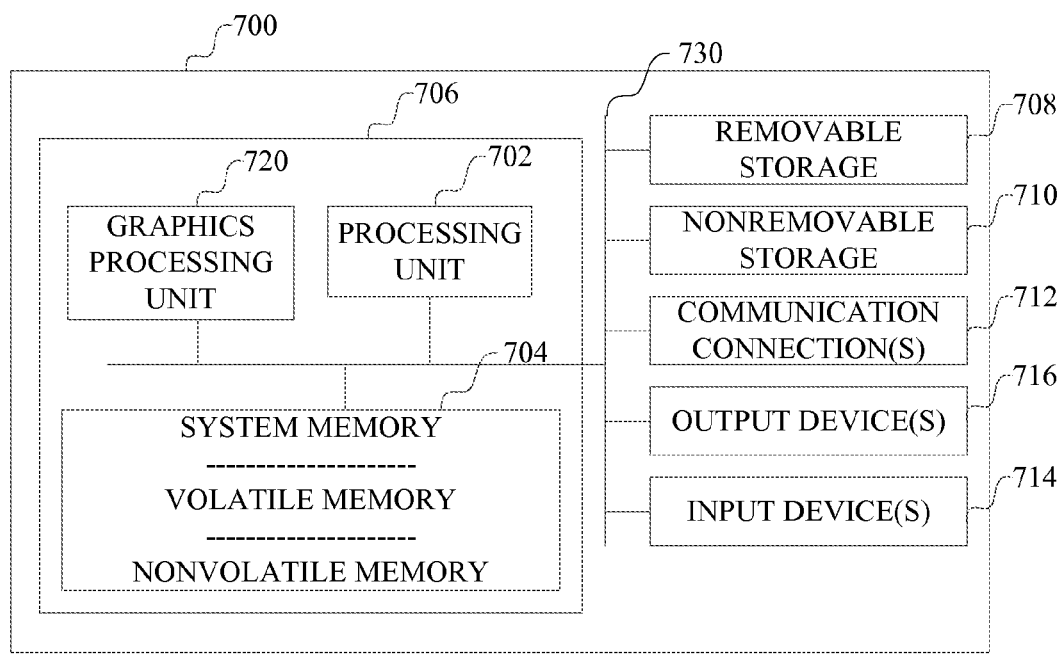
FIG. 7 is a block diagram of an example computer with which such a system can be implemented.

FIG. 7 illustrates an example of a suitable computer. This computer is only one example and is not intended to suggest any limitation as to the scope of use or functionality of this data processing system.

With reference to FIG. 7, an example computer 700, in its most basic configuration, typically includes at least one processing unit 702 and memory 704. The computer may include multiple processing units and/or additional co-processing units such as graphics processing unit 720. Depending on the exact configuration and type of computer, memory 704 may be volatile (such as RAM), non-volatile (such as ROM, flash memory, etc.) or some combination of the two. This most basic configuration is illustrated in FIG. 7 by dashed line 706. Additionally, computer 700 may also have additional features/functionality. For example, computer 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other device or article which can be used to store the desired information and which can accessed by computer 700. Any such computer storage media may be part of computer 700.

Computer 700 may also contain communications connection(s) 712 that allow the computer to communicate with other devices over a communication medium. Communication media typically carry computer program instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communication connections 712 are devices that interface with the communication media to transmit data over and receive data from communication media.

Computer 700 may have various input device(s) 714 such as a keyboard, mouse, pen, camera, touch input device, and so on. Output device(s) 716 such as a display, speakers, a printer, and so on may also be included. All of these devices are well known in the art and need not be discussed at length here.

The various components in FIG. 7 are generally interconnected by an interconnection mechanism, such as one or more buses 730.

The various components of the data processing system may be implemented using computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular data types for storing data in a storage medium. In a distributed computing environment, where tasks are performed by multiple processing devices that are linked through a communications network, program modules may be located in both local and remote computer storage media including memory storage devices.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. In a distributed message processing system, having a plurality of nodes implemented on one or more computers, each node independently processing input streams of data, according to a set of independent, asynchronous processing components connected in a manner represented by a directed graph, a process for dynamically updating, on each node, a runtime version of computer program defining the set of processing components during execution of the runtime version, comprising:
    receiving a new runtime version of the computer program into memory;
    determining differences between the new runtime version of the computer program and a current runtime version of the computer program;
    preparing a change listing defining an ordered set of commands for each node to perform to modify the current runtime version of the computer program into the new runtime version of the computer program, such commands being invertible such that when an inverse of such commands are performed in reverse order, the current runtime version of the computer program is restored;
    pausing the input streams of data from being provided to the nodes;
    instructing each node to update the runtime version of the computer program from the current version to the new version;
    monitoring progress of updates to the nodes;
    after failure of the update by one or more nodes, instructing the nodes to rollback the update to the current runtime version of the computer program; and
    after rollback or successful update by the nodes, resuming the input streams of data to be provided to the nodes.

2. The process of claim 1, wherein monitoring progress of updates to the nodes comprises:
    maintaining a queue wherein each entry of the queue includes a command from the change list and a status for each of the nodes for completing the command.

3. The process of claim 2, further comprising receiving, from each of the nodes, for each command, a status for the node for the command.

4. The process of claim 3, wherein, for each command in the queue, each node waits for the other nodes to complete processing the command before proceeding to the next entry in the queue.

5. The process of claim 1, further comprising adding a new node during the update, and starting the new node with the configuration of the nodes after the update completes on the nodes.

6. The process of claim 5, further comprising restarting one of the nodes, and treating the restarted node as a new node.

7. The process of claim 1, wherein the computer program is defined by a tree-based data structure.

8. The process of claim 7, wherein determining the differences between the new runtime version of the computer program and the current runtime version of the computer program comprises applying a tree-based difference algorithm.

9. A distributed message processing system comprising:
    a plurality of nodes implemented on one or more computers, each node independently processing input streams of data, according to a set of independent, asynchronous processing components connected in a manner represented by a directed graph;
    a computer operating an update manager configured to perform a process for dynamically updating, on each node, a runtime version of computer program defining the set of processing components during execution of the runtime version, the update manager configured to:
    receive a new runtime version of the computer program into memory;
    determine differences between the new runtime version of the computer program and a current runtime version of the computer program;
    generate a change listing defining an ordered set of commands for each node of the plurality of nodes to perform to modify the current runtime version of the computer program into the new runtime version of the computer program, such commands being invertible such that when an inverse of such commands are performed in reverse order, the current runtime version of the computer program is restored;
    pause the input streams of data from being provided to the plurality of nodes;
    instruct each node of the plurality of nodes to update the runtime version of the computer program from the current version to the new version;
    monitor progress of updates to the plurality of nodes;
    after failure of the update by one or more nodes of the plurality of nodes, instruct all of the nodes to rollback the update to the current runtime version of the computer program; and
    after rollback or successful update by the plurality of nodes, resume the input streams of data to be provided to the plurality of nodes.

10. The distributed message processing system of claim 9, wherein to monitor progress of updates to the nodes, the update manager is further configured to:
    maintain a queue wherein each entry of the queue includes a command from the change list and a status for each of the nodes for completing the command.

11. The distributed message processing system of claim 10, wherein to maintain the queue, the update manager is further configured to receive, from each of the nodes, for each command, a status for the node for the command.

12. The distributed message processing system of claim 11, wherein, for each command in the queue, each node waits for the other nodes to complete processing the command before proceeding to the next entry in the queue.

13. The distributed message processing system of claim 9, wherein the update manager is further configured to add a new node during the update, wherein the new node is started with the configuration of the nodes after the update completes on the nodes.

14. The distributed message processing system of claim 13, wherein when one of the nodes is restarted, and the update manager is configured to treat the restarted node as a new node.

15. The distributed message processing system of claim 9, wherein the computer program is defined by a tree-based data structure.

16. The distributed message processing system of claim 15, wherein to determine the differences between the new runtime version of the computer program and the current runtime version of the computer program, the update manager is configured to apply a tree-based difference algorithm.

17. An article of manufacture comprising a non-transitory computer storage medium storing instructions that when executed by a computer configure the computer to provide an update manager for a distributed message processing system having a plurality of nodes implemented on one or more computers, each node independently processing input streams of data, according to a set of independent, asynchronous processing components connected in a manner represented by a directed graph, the update manager configured to perform a process for dynamically updating, on each node, a runtime version of a computer program defining the set of processing components during execution of the runtime version, the update manager configured to:
  receive a new runtime version of the computer program into memory;
  determine differences between the new runtime version of the computer program and a current runtime version of the computer program;
  generate a change listing defining an ordered set of commands for each node of the plurality of nodes to perform to modify the current runtime version of the computer program into the new runtime version of the computer program, such commands being invertible such that when an inverse of such commands are performed in reverse order, the current runtime version of the computer program is restored;
  pause the input streams of data from being provided to the plurality of nodes;
  instruct each node of the plurality of nodes to update the runtime version of the computer program from the current version to the new version;
  monitor progress of updates to the plurality of nodes;
  after failure of the update by one or more nodes of the plurality of nodes, instruct the plurality of nodes to rollback the update to the current runtime version of the computer program; and
  after rollback or successful update by the plurality of nodes, resume the input streams of data to be provided to the plurality of nodes.

18. The article of manufacture of claim 17, wherein to monitor progress of updates to the nodes, the update manager is further configured to:
  maintain a queue wherein each entry of the queue includes a command from the change list and a status for each of the nodes for completing the command.

19. The article of manufacture of claim 18, wherein to maintain the queue, the update manager is further configured to receive, from each of the nodes, for each command, a status for the node for the command.

20. The article of manufacture of claim 19, wherein, for each command in the queue, each node waits for the other nodes to complete processing the command before proceeding to the next entry in the queue.

* * * * *